United States Patent
Wu et al.

(10) Patent No.: US 11,915,359 B2
(45) Date of Patent: Feb. 27, 2024

(54) KERNEL SOFTWARE DRIVEN COLOR REMAPPING OF RENDERED PRIMARY SURFACES

(71) Applicants: Advanced Micro Devices, Inc., Santa Clara, CA (US); ATI Technologies ULC, Markham (CA)

(72) Inventors: Jason Wen-Tse Wu, Richmond Hill (CA); Parimalkumar Patel, Brampton (CA); Jia Hui Li, Thornhill (CA); Chao Zhan, Shanghai (CN)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 16/712,771

(22) Filed: Dec. 12, 2019

(65) Prior Publication Data

US 2021/0174571 A1 Jun. 10, 2021

(30) Foreign Application Priority Data

Dec. 5, 2019 (CN) .......................... 201911233223.1

(51) Int. Cl.
*G06T 15/04* (2011.01)
*G06F 9/54* (2006.01)
(Continued)

(52) U.S. Cl.
CPC ............ *G06T 15/04* (2013.01); *G06F 9/3877* (2013.01); *G06F 9/4411* (2013.01); *G06F 9/545* (2013.01); *G06F 16/9017* (2019.01)

(58) Field of Classification Search
CPC .... G06T 15/04; G06F 16/9017; G06F 9/4411; G06F 9/545; G06F 9/3877;
(Continued)

(56) References Cited

U.S. PATENT DOCUMENTS 4,980,836 A 12/1990 Carter et al.
5,396,635 A 3/1995 Fung
(Continued)

OTHER PUBLICATIONS

Yuan et al., "Buffering Approach for Energy Saving in Video Sensors", 2003 International Conference on Multimedia and Expo, Jul. 2003, 4 pages.

(Continued)

*Primary Examiner* — King Y Poon
*Assistant Examiner* — Vincent Peren
(74) *Attorney, Agent, or Firm* — Kowert, Hood, Munyon, Rankin & Goetzel, P.C.; Rory D. Rankin

(57) ABSTRACT

Systems, apparatuses, and methods for implementing kernel software driven color remapping of rendered primary surfaces are disclosed. A system includes at least a general processor, a graphics processor, and a memory. The general processor executes a user-mode application, a user-mode driver, and a kernel-mode driver. A primary surface is rendered on the graphics processor on behalf of the user-mode application. The primary surface is stored in memory locations allocated for the primary surface by the user-mode driver and the kernel-mode driver is notified when the primary surface is ready to be displayed. Rather than displaying the primary surface, the kernel-mode driver causes the pixels of the primary surface to be remapped on the graphics processor using a selected lookup table (LUT) so as to generate a remapped surface which stored in memory locations allocated for the remapped surface by the user-mode driver. Then, the remapped surface is displayed.

20 Claims, 9 Drawing Sheets

(51) Int. Cl.
*G06F 9/38* (2018.01)
*G06F 16/901* (2019.01)
*G06F 9/4401* (2018.01)

(58) Field of Classification Search
CPC ... G09G 2320/0223; G09G 2320/0252; G09G 2360/12; G09G 2340/14; G09G 2340/16; G09G 5/399
See application file for complete search history.

(56) References Cited

U.S. PATENT DOCUMENTS

| | | | |
|---|---|---|---|
| 5,617,572 A | 4/1997 | Pearce et al. | |
| 5,692,202 A | 11/1997 | Kardach et al. | |
| 5,801,717 A * | 9/1998 | Engstrom | G09G 5/397 345/422 |
| 6,334,167 B1 | 12/2001 | Gerchman et al. | |
| 6,657,634 B1 | 12/2003 | Sinclair et al. | |
| 7,028,200 B2 | 4/2006 | Ma | |
| 7,085,941 B2 | 8/2006 | Li | |
| 7,428,644 B2 | 9/2008 | Jeddeloh et al. | |
| 7,437,579 B2 | 10/2008 | Jeddeloh et al. | |
| 7,496,777 B2 | 2/2009 | Kapil | |
| 7,613,941 B2 | 11/2009 | Samson et al. | |
| 7,743,267 B2 | 6/2010 | Snyder et al. | |
| 7,800,621 B2 | 9/2010 | Fry | |
| 7,802,060 B2 | 9/2010 | Hildebrand | |
| 7,840,827 B2 | 11/2010 | Dahan et al. | |
| 7,868,479 B2 | 1/2011 | Subramaniam | |
| 7,873,850 B2 | 1/2011 | Cepulis et al. | |
| 7,899,990 B2 | 3/2011 | Moll et al. | |
| 8,181,046 B2 | 5/2012 | Marcu et al. | |
| 8,402,232 B2 | 3/2013 | Avudaiyappan et al. | |
| 8,656,198 B2 | 2/2014 | Branover et al. | |
| 9,110,674 B1 | 8/2015 | Cui et al. | |
| 11,100,698 B2 | 8/2021 | Chan et al. | |
| 2006/0132491 A1* | 6/2006 | Riach | G09G 5/363 345/505 |
| 2007/0019003 A1* | 1/2007 | Imai | G09G 3/3611 345/629 |
| 2007/0206018 A1 | 9/2007 | Bajic et al. | |
| 2010/0123725 A1* | 5/2010 | Azar | G06F 3/14 345/501 |
| 2012/0293519 A1 | 11/2012 | Ribble et al. | |
| 2014/0184619 A1 | 7/2014 | Kim | |
| 2015/0317762 A1 | 11/2015 | Park et al. | |
| 2016/0011645 A1 | 1/2016 | Min | |
| 2016/0055615 A1 | 2/2016 | Huang | |
| 2016/0259392 A1 | 9/2016 | Weissmann et al. | |
| 2016/0370844 A1 | 12/2016 | Kumar | |
| 2018/0101205 A1 | 4/2018 | Conroy et al. | |
| 2018/0157315 A1 | 6/2018 | Ehsan et al. | |
| 2018/0300838 A1 | 10/2018 | Park et al. | |
| 2019/0057484 A1 | 2/2019 | Iwamoto et al. | |
| 2020/0097061 A1 | 3/2020 | Ostby et al. | |

OTHER PUBLICATIONS

"Intel Power Management Technologies for Processor Graphics, Display, and Memory: White Paper for 2010-2011 Desktop and Notebook Platforms", Intel Corporation, Aug. 2010, 10 pages.
International Search Report and Written Opinion in International Application No. PCT/IB2020/054450, dated Jul. 9, 2020, 8 pages.

* cited by examiner

KERNEL SOFTWARE DRIVEN COLOR REMAPPING OF RENDERED PRIMARY SURFACES

PRIORITY INFORMATION

This application claims benefit of priority to Chinese Application No. 201911233223.1, entitled "Kernel Software Driven Color Remapping of Rendered Primary Surfaces", filed Dec. 5, 2019, the entirety of which is incorporated herein by reference in its entirety.

BACKGROUND

Description of the Related Art

When displaying videos or other content that changes over time, some displays will generate visual artifacts that can detract from the user's viewing experience. These visual artifacts can be caused by a slow and/or variable response time for the pixels on the display to change colors or brightness. For example, in one scenario, pixels are often made up of subpixels which can take on values from 0 to 255 for video with 8 bits of pixel depth. Subpixels refer to the different pixel channels (e.g., red, green, blue, luminance, chrominance) of an individual pixel of an image or frame. It is noted that for ease of discussion, the term "pixel" may be used to refer to subpixels herein.

Changing content causes pixel levels to vary for individual pixels from one frame to the next frame. While an individual pixel of a video frame is supposed to transition from a first value to a second value, the actual pixel on the display may not be able to effect this transition quickly enough to match the video frame rate (e.g., 60 frames per second). In general, changes in brightness for different colors may occur on different time scales, causing visual artifacts or motion blur when a new frame is displayed. Also, in cases where stereo rendering is being performed for separate left-eye and right-eye portions of a display, blurring can occur where the left-eye and right-eye portions merge.

To mitigate these negative visual effects, a feature called pixel overdrive can be used. For example, a given pixel of a rendered frame might be expected to transition from 0 to 127, but the corresponding physical pixel on the display is too slow to effect this transition in time for the next frame. To compensate for this slow response time, the physical pixel can actually be briefly driven with a voltage corresponding to a higher value, such as 160, in order to accelerate the transition to the target level of 127. Ideally, the physical pixel will not reach the color corresponding to 160 (which would to a different type of visual artifact) by the end of the frame period, but the physical pixel is likely to be closer to the color corresponding to the desired 127 than would otherwise be the case. The particular pixel values in this example are merely illustrative of the concept of pixel overdrive and are not intended to limit the scenarios in which pixel overdrive or other post-processing steps can be applied.

One way to implement the pixel overdrive feature is with an extra hardware component which modifies the pixel values as they are about to be displayed. However, using an extra hardware component is a costly solution.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for kernel software driven color remapping of rendered primary surfaces are disclosed herein. In one implementation, a system includes at least a general processor, a graphics processor, and a memory. The general processor executes a user-mode application, a user-mode driver, and a kernel-mode driver. The user-mode driver causes a primary surface to be rendered on the graphics processor on behalf of the user-mode application. The user-mode driver also allocates memory for a copy of the primary surface. When rendering of the primary surface is finished, the kernel-mode driver is notified that the primary surface is ready to be displayed. Rather than displaying the primary surface, the kernel-mode driver causes the pixels of the primary surface to be remapped using a selected lookup table (LUT) so as to generate a remapped surface. This remapping is performed by the graphics processor. The selected LUT defines what the response should be for a particular display and/or settings and operating conditions of the particular display. The remapped surface is written to the memory locations that the user-mode driver allocated for the copy of the primary surface. Then, the remapped surface is driven to a display.

Figure 1:
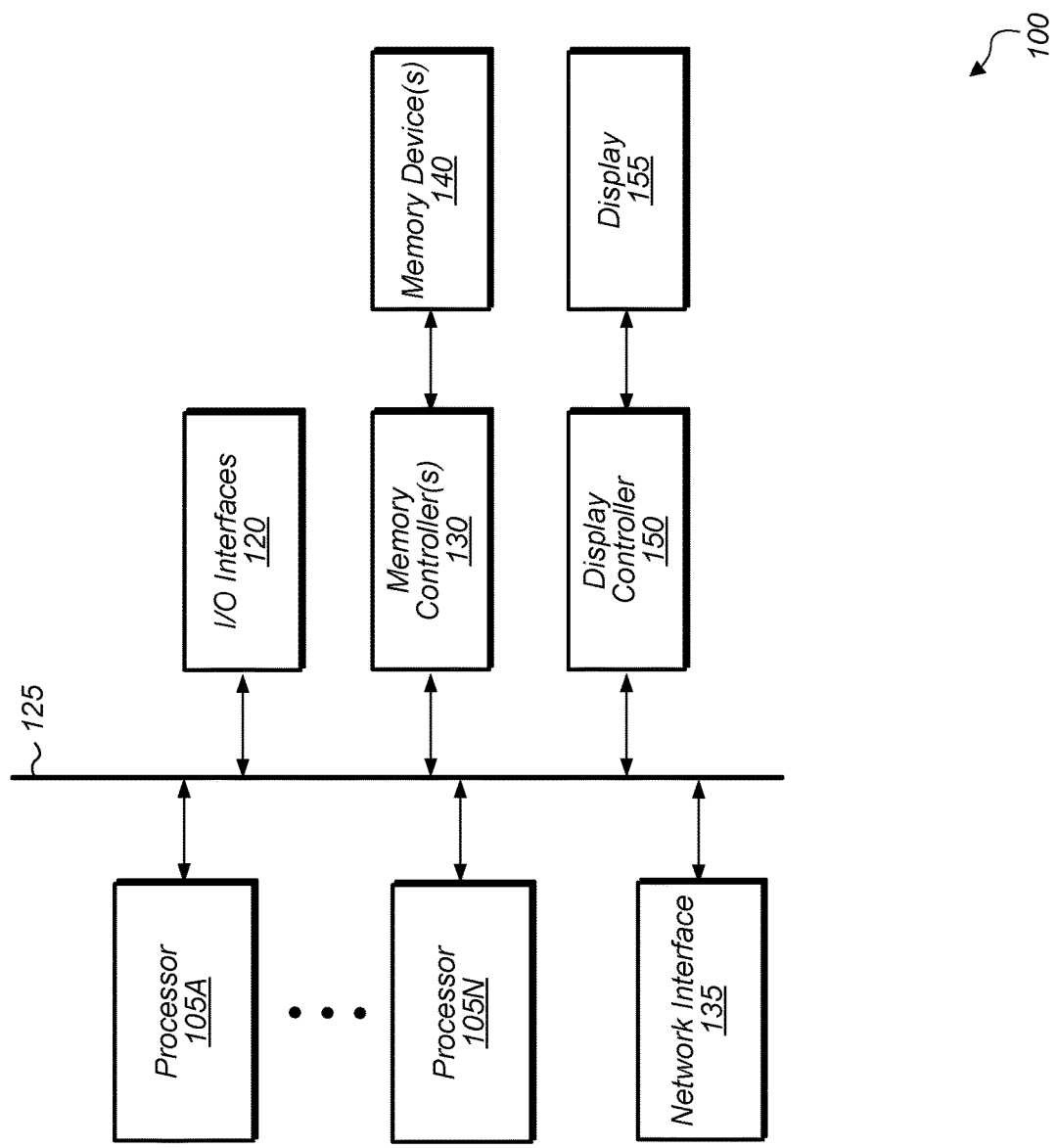
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus/fabric 125, memory controller(s) 130, network interface 135, memory device(s) 140, display controller 150, and display 150. In other implementations, computing system 100 includes other components and/or computing system 100 is arranged differently. Processors 105A-N are representative of any number of processors which are included in system 100. Bus/fabric 125 is representative of any type and configuration of bus and/or interconnect fabric for providing connections between the components of system 100. In some cases, bus/fabric 125 includes multiple different bus or fabric components that are compatible with any number of protocols.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides a plurality of pixels to display controller 150 to be driven to display 155. In this implementation, processor 105N remaps pixels of a primary surface to create a remapped surface which is driven to display 155. This remapping of pixels will be described in more detail throughout the remainder of this document.

Memory controller(s) 130 are representative of any number and type of memory controllers accessible by processors 105A-N and I/O devices (not shown) coupled to I/O interfaces 120. Memory controller(s) 130 are coupled to any number and type of memory devices(s) 140. Memory device (s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
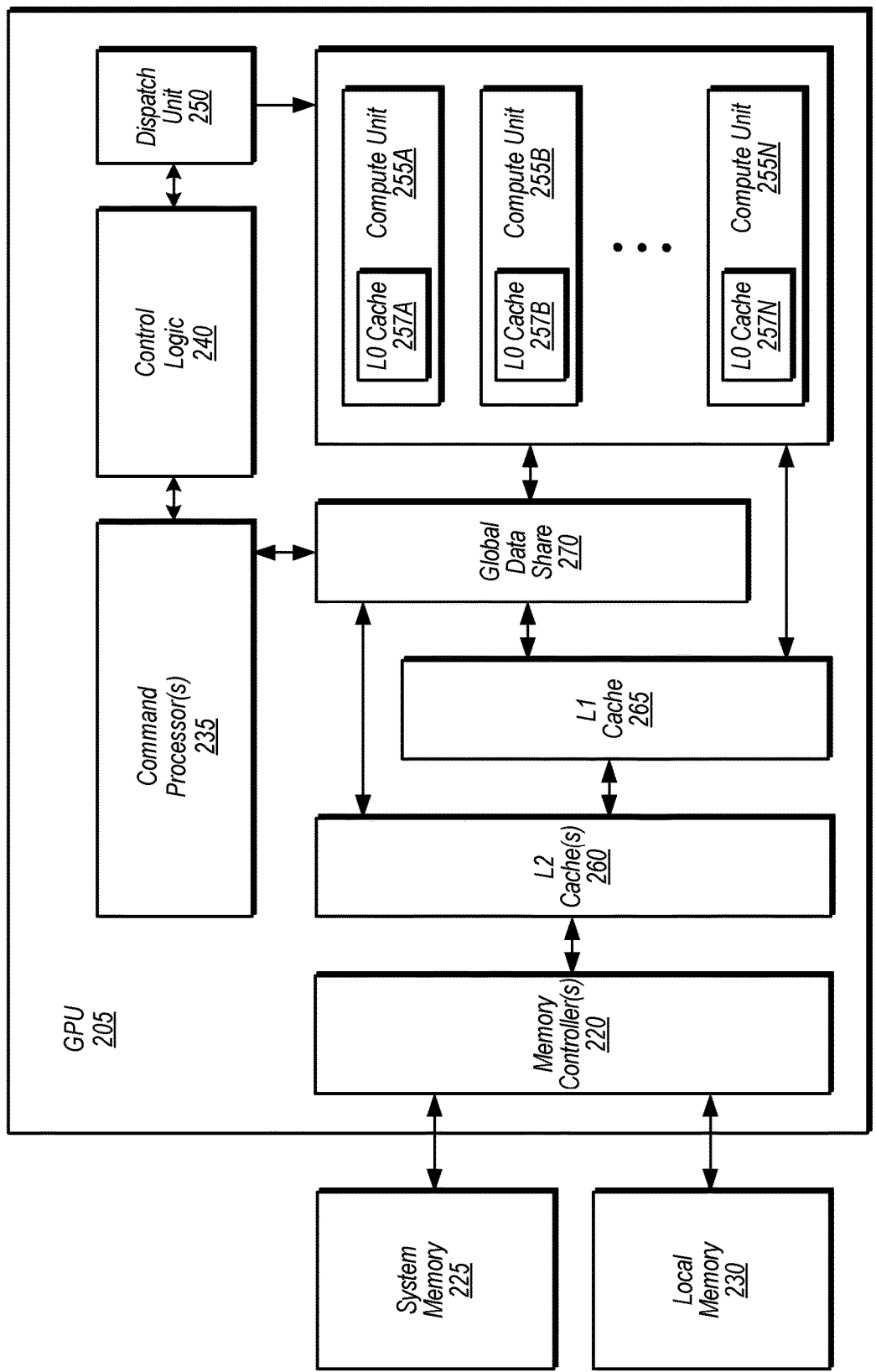
FIG. 2 is a block diagram of one implementation of a computing system.

Turning now to FIG. 2, a block diagram of one implementation of a computing system 200 is shown. In one implementation, system 200 includes GPU 205, system memory 225, and local memory 230. System 200 also includes other components which are not shown to avoid obscuring the figure. GPU 205 includes at least command processor(s) 235, control logic 240, dispatch unit 250, compute units 255A-N, memory controller(s) 220, global data share 270, shared level one (L1) cache 265, and level two (L2) cache(s) 260. It should be understood that the components and connections shown for GPU 205 are merely representative of one type of GPU. This example does not preclude the use of other types of GPUs (or other types of parallel processors) for implementing the techniques presented herein. In other implementations, GPU 205 includes other components, omits one or more of the illustrated components, has multiple instances of a component even if only one instance is shown in FIG. 2, and/or is organized in other suitable manners. Also, each connection shown in FIG. 2 is representative of any number of connections between components. Additionally, other connections can exist between components even if these connections are not explicitly shown in FIG. 2.

In various implementations, computing system 200 executes any of various types of software applications and/or software drivers. As part of executing a given software application/driver, a host CPU (not shown) of computing system 200 launches kernels to be performed on GPU 205. Command processor(s) 235 receive kernels from the host CPU and use dispatch unit 250 to dispatch wavefronts of these kernels to compute units 255A-N. Threads within kernels executing on compute units 255A-N read and write data to corresponding local L0 caches 257A-N, global data share 270, shared L1 cache 265, and L2 cache(s) 260 within GPU 205. It is noted that each local L0 cache 257A-N and/or shared L1 cache 265 can include separate structures for data and instruction caches. While the implementation shown in system 200 has a 3-level cache hierarchy, it should be understood that this is merely one example of a multi-level cache hierarchy that can be used. In other implementations, other types of cache hierarchies with other numbers of cache levels can be employed.

Figure 3:
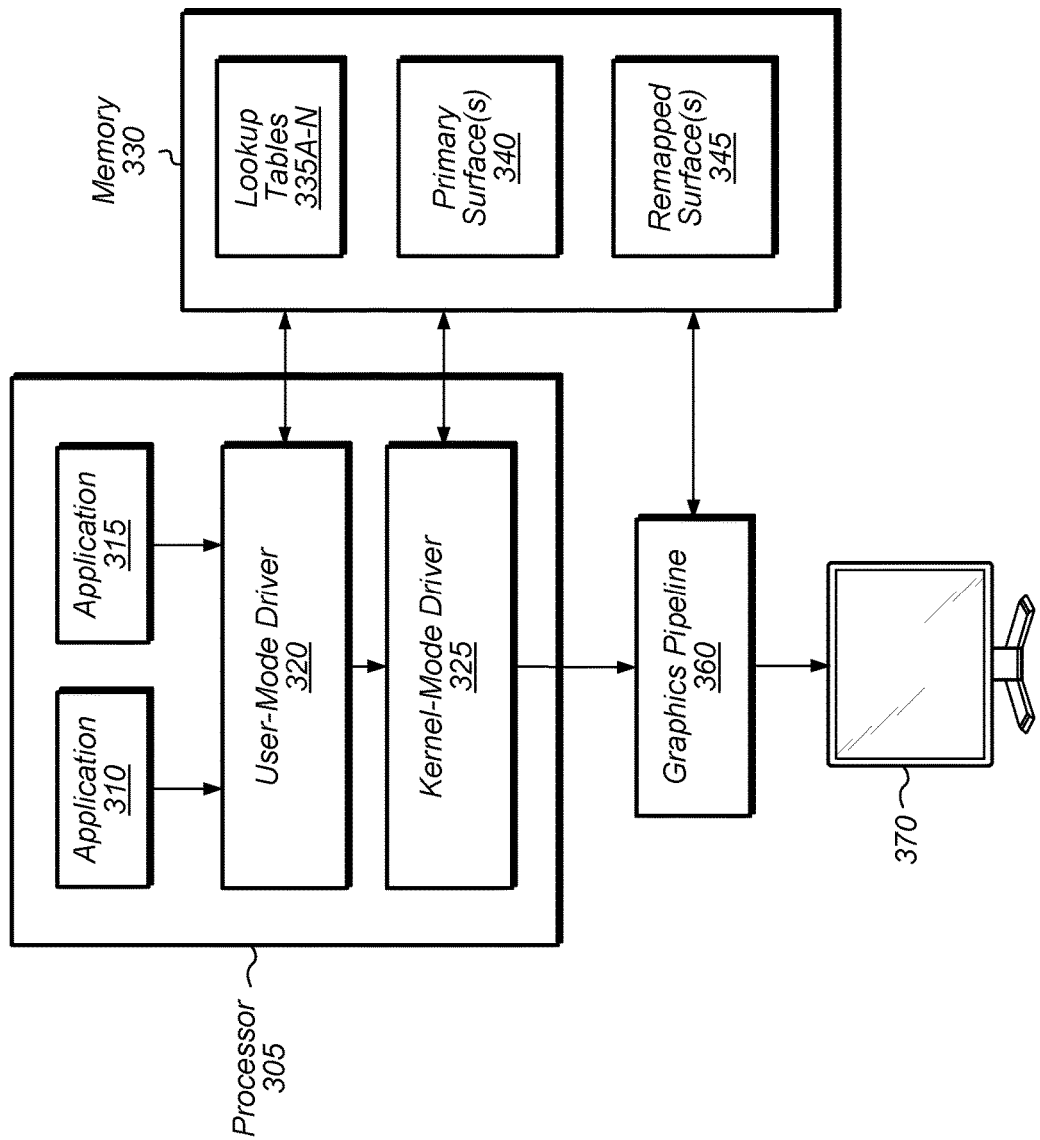
FIG. 3 is a block diagram of one implementation of a computing system.

Referring now to FIG. 3, a block diagram of one implementation of a computing system 300 is shown. In one implementation, computing system 300 includes processor 305, memory 330, graphics pipeline 360, and display 370. System 300 can also include any number of other components (e.g., I/O fabric, power supply, I/O devices, network interface) which are not shown to avoid obscuring the figure. In one implementation, processor 305 executes multiple software components which are shown as applications 310 and 315, user-mode driver 320, and kernel-mode driver 325. Processor 305 can also include any number of other software components. Memory 330 is representative of any number of cache or memory devices for storing lookup tables 335A-N, primary surface(s) 340 and remapped surface(s) 345. Memory 330 can also store other data and/or instructions. Graphics pipeline 360 is representative of any type of graphics hardware. For example, in one implementation, graphics pipeline 360 is a GPU (e.g., GPU 205 of FIG. 2). In other implementations, graphics pipeline 360 includes other types of processing resources (e.g., FPGA, ASIC).

In one implementation, application 310 is a user-mode application which supplies lookup tables (LUTs) 335A-N to user-mode driver 320. LUTs 335A-N are representative of any number of LUTs 335A-N for remapping pixels of primary surfaces to create remapped surfaces. User-mode driver 320 allocates memory for storing LUTs 335A-N in memory 330. In one implementation, LUTs 335A-N include a plurality of tables with each table designed for a particular type of display. In this implementation, one of LUTs 335A-N is specific to display 370, and application 310 provides an index of this specific table to user-mode driver 320. In another implementation, the plurality of LUTs 335A-N correspond to a single display 370, and application 310 provides an index to the LUT which matches the specific operating conditions (e.g., frequency, temperature) of display 370. In one implementation, each of LUTs 335A-N is implemented as a 256 pixels by 256 pixels by 3 channels table. In this implementation, each red, green, and blue channel of a surface is remapped independently of the other channels. In other implementations, LUTs 335A-N can have other numbers of pixels and/or other numbers of channels.

It is noted that in one implementation, user-mode applications 310 and 315 and user-mode driver 320 are at an unprivileged protection level with respect to graphics pipeline 360. In other words, user-mode applications 310 and 315 and user-mode driver 320 do not have privileges for directly accessing the processing resources of graphics pipeline 360. To access the processing resources of graphics pipeline 360, user-mode driver 320 goes through kernel-mode driver 325 which resides at a privileged protection level with respect to graphics pipeline 360. User-mode driver 320 only has access to the user space address space which has been allocated for user-mode application 315. As used herein, the term "user-mode" refers to a driver or application that lacks system privileges. Also, the term "kernel-mode" refers to a driver or application that has system privileges. Generally speaking, a "kernel-mode" driver or application has greater access to system resources (e.g., kernel address spaces, peripheral devices, operating system settings, processing units) than a "user-mode" driver or application.

In one implementation, user-mode application 315 is a graphics application (e.g., three-dimensional (3D) application) which renders frames to be shown on display 370. When the rendering of a new frame is initiated by application 315, user-mode driver 320 allocates buffers for two sets of surfaces for the frame. These two sets of surfaces are shown as primary surface(s) 340 and remapped surface(s) 345. In this example, remapped surface(s) 345 are intended to be remapped copies of primary surface(s) 340, with the remapped surface(s) 345 and primary surface(s) 340 sharing the same size (i.e., pixel dimensions) and properties.

In one implementation, primary surface(s) 340 are representative of the final composite surface(s) that are intended for display 370. A final composite surface can also be referred to herein as a frame or composite frame. The size of primary surface(s) 340 in terms of number of pixels can vary according to the implementation and the size of display 370. Application 315 can actually render a plurality of smaller surfaces which are combined together to create primary surface(s) 340. For a stereo display, primary surface(s) 340 will include two surfaces while for a non-stereo display, primary surface(s) 340 will only include a single surface.

In one implementation, application 315 dispatches rendering commands to user-mode driver 320 to render primary surface(s) 340. In this implementation, user-mode driver 320 converts the rendering commands into hardware-specific commands which are compatible with graphics pipeline 360. Then, kernel-mode driver 320 launches shaders on graphics pipeline 360 so as to execute the hardware-specific commands. Once a final composite primary surface 340 has been rendered, a flip request is generated for kernel-mode driver 325 to drive primary surface 340 to display 370. As used herein, a "flip request" is defined as a request to drive the pixels in a back buffer to the display by swapping the pointers between a front buffer and a back buffer. When the pointers are swapped, the previous back buffer becomes the new front buffer and the previous front buffer becomes the new back buffer. However, rather than driving primary surface 340 to display 340 in response to receiving the flip request, kernel-mode driver 325 launches a plurality of shaders on graphics pipeline 360 to process primary surface 340 with a given LUT from LUTs 335A-N so as to generate remapped surface 345. In one implementation, primary surface 340 and the previous primary surface (not shown) are processed using the given LUT so as to generate remapped surface 345. When remapped surface 345 is ready, a flip is triggered to cause remapped surface 345 to be written to display 370. When the flip is triggered, the previous remapped surface (representing the previous video frame) that was being driven to display 370 becomes the new back buffer and remapped surface 345 becomes the new front buffer.

The above-described process can be repeated for each video frame that is generated by application 315. By performing this process, rendered surfaces are remapped (i.e., having their original pixel values modified to generate new pixel values) for display 370 without requiring a special hardware component to perform the remapping. Rather, the remapping is performed using graphics pipeline 360.

Figure 4:
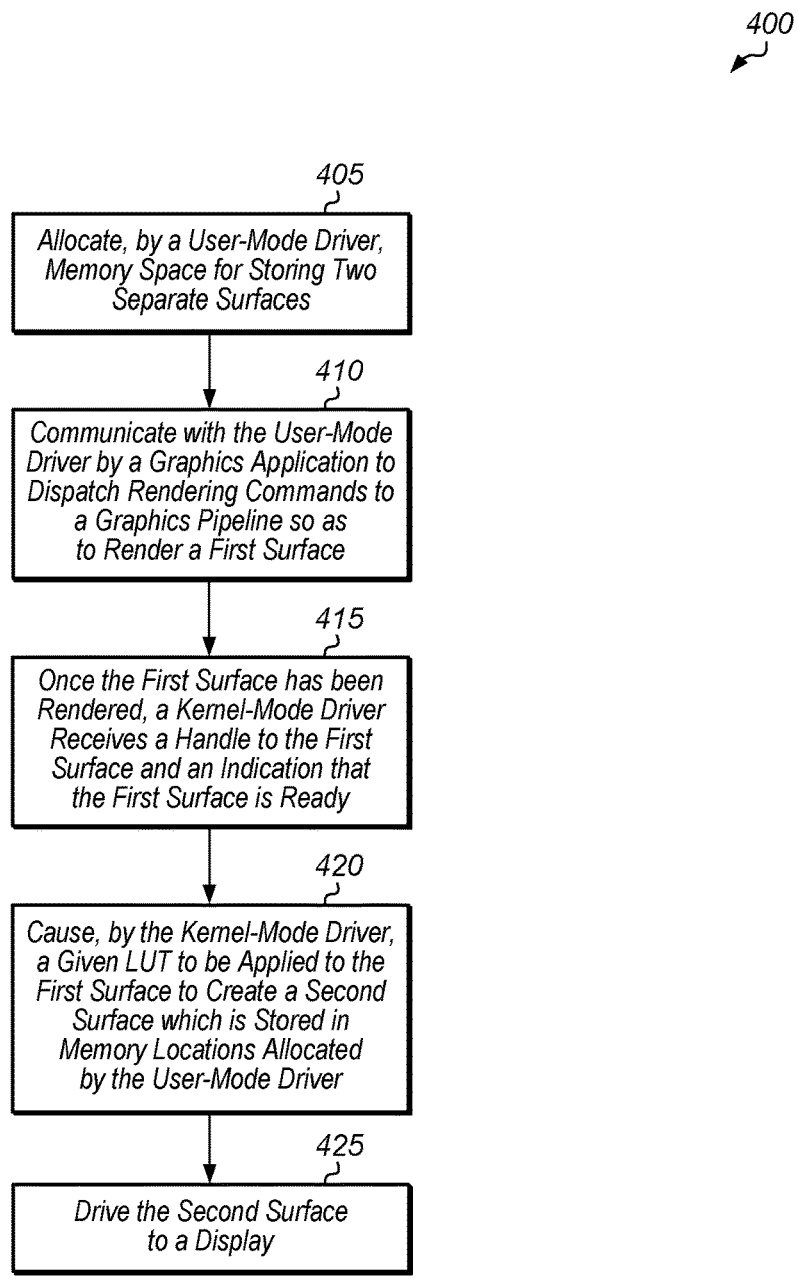
FIG. 4 is a generalized flow diagram illustrating one implementation of a method for selecting a LUT to apply to a surface.

Turning now to FIG. 4, one implementation of a method 400 for selecting a LUT to apply to a surface is shown. For purposes of discussion, the steps in this implementation and those of FIG. 5-8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 400.

A user-mode driver allocates memory space for storing two separate surfaces (block 405). The two separate surfaces, for which the user-mode driver allocates memory space, can be referred to as a first surface and a second surface. Alternatively, the two surfaces can be referred to as a primary surface and a remapped surface. It should be understood that the first surface and the second surface can each include multiple surfaces. For example, for stereo rendering, the first surface includes a left-eye portion and a right-eye portion which can be rendered as different surfaces. Alternatively, for non-stereo rendering, the first surface is representative of a single surface.

Next, a graphics application communicates with the user-mode driver to dispatch rendering commands to a graphics pipeline so as to render a first surface (block 410). In one implementation, the graphics application generates hardware-agnostic rendering commands that are converted by the user-mode driver into hardware-specific rendering commands targeting a particular graphics pipeline. It is noted that the first surface can also be referred to as a composite surface or a frame.

Once the first surface has been rendered, a kernel-mode driver receives a handle to the first surface and an indication that the first surface is ready (block 415). As used herein, a "handle" is defined as an identifier that is associated with an available resource (e.g., a buffer). Next, the kernel-mode driver causes a given lookup table (LUT) to be applied to the first surface to create a second surface which is then stored in the memory locations allocated by the user-mode driver (block 420). In one implementation, the kernel-mode driver launches a plurality of shaders on the graphics pipeline to remap the first surface based on the given LUT. Then, the second surface is driven to a display (block 425). After block 425, method 400 ends. In one implementation, method 400 is repeated for each video frame of a video sequence.

Figure 5:
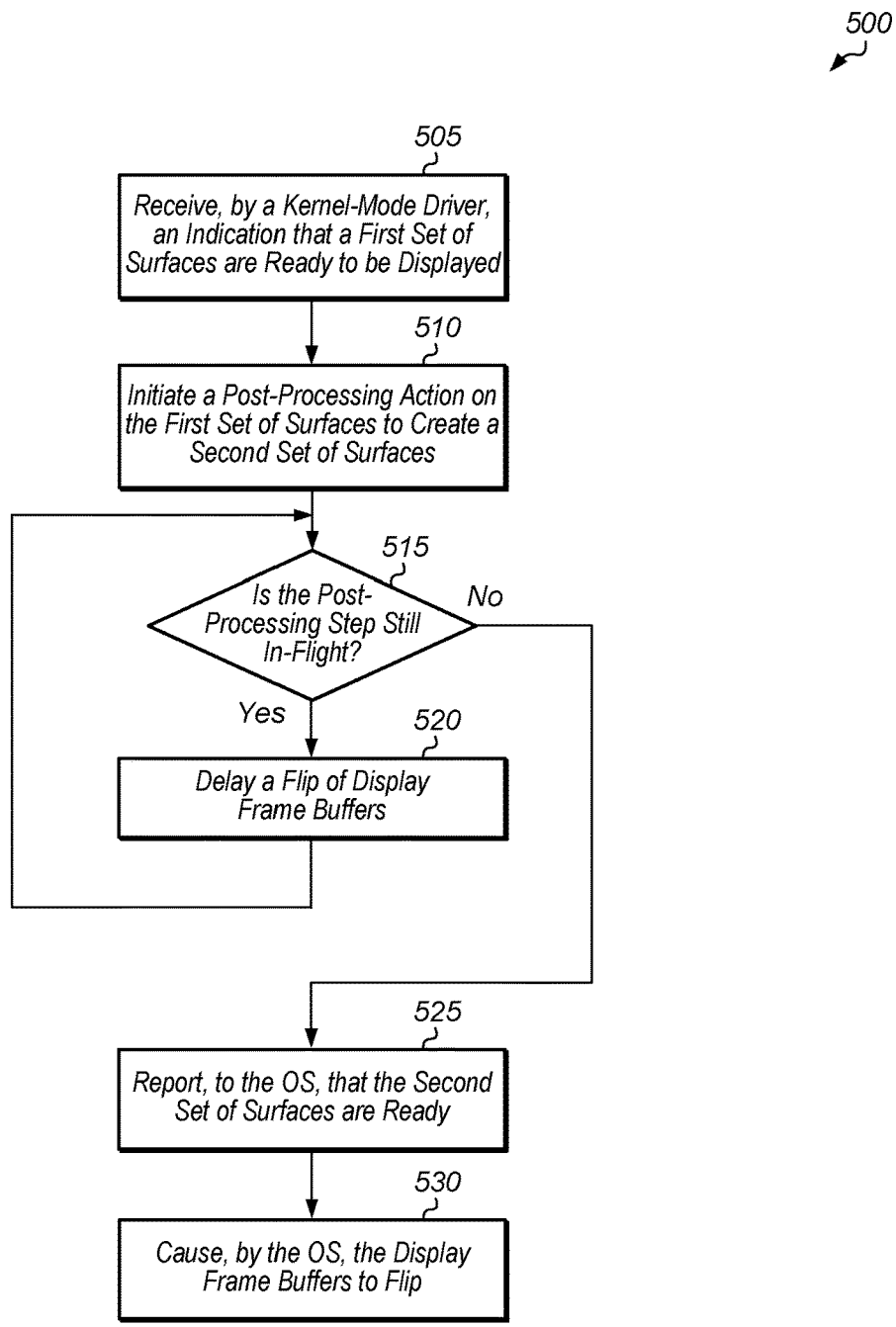
FIG. 5 is a generalized flow diagram illustrating one implementation of a method for performing a post-processing action on a first set of surfaces.

Referring now to FIG. 5, one implementation of a method 500 for performing a post-processing action on a first set of surfaces is shown. A kernel-mode driver receives an indication that a first set of surfaces are ready to be displayed (block 505). In one implementation, the first set of surfaces includes a left portion and a right portion which together make up an entire frame. In another implementation, the first set of surfaces might actually be a single surface. The kernel-mode driver initiates a post-processing action on the first set of surfaces to create a second set of surfaces (block 510). In one implementation, the post-processing action involves applying a remapping LUT to the first set of surfaces. In other implementations, the post-processing action can involve other types of post-processing steps.

While the post-processing action is in-flight (conditional block 515, "yes" leg), the kernel-mode driver delays a flip of display frame buffers (block 520). After block 520, method 500 returns to conditional block 515. In one implementation, the kernel-mode driver delays the flip by withholding reporting of the present ID to the OS in the vertical synchronization (VSYNC) interrupt until the first set of surfaces are ready to flip. If the post-processing action is complete (conditional block 515, "no" leg), then the kernel-mode drive reports, to the OS, that the second set of surfaces are ready (block 525). Next, the OS causes the display frame buffers to flip (block 530). After block 530, method 500 ends.

Figure 6:
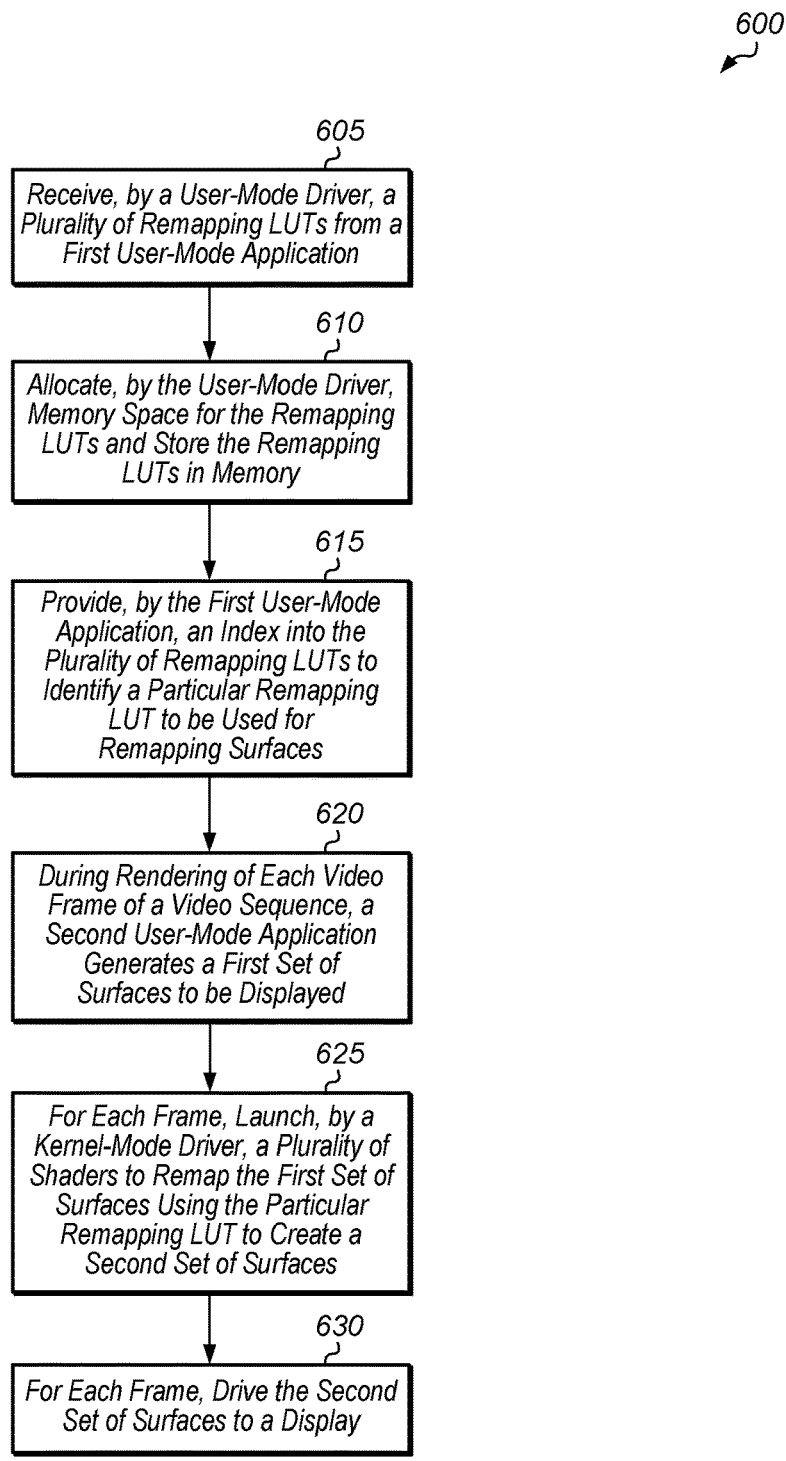
FIG. 6 is a generalized flow diagram illustrating one implementation of a method for employing LUTs for remapping surfaces.

Turning now to FIG. 6, one implementation of a method 600 for employing lookup tables (LUTs) for remapping surfaces is shown. A user-mode driver receives a plurality of remapping LUTs from a first user-mode application (block 605). In one implementation, each remapping LUT of the plurality of remapping LUTs is optimized for a different set of operating conditions of a target display. The user-mode driver allocates memory space for the remapping LUTs and stores the remapping LUTs in memory (block 610). The first user-mode application provide an index into the plurality of remapping LUTs to identify a particular remapping LUT to be used for remapping surfaces (block 615).

During rendering of each video frame of a video sequence, a second user-mode application generates a first set of surfaces to be displayed (block 620). In one implementation, the second user-mode application is a different application from the first user-mode application. For each frame, a kernel-mode driver launches a plurality of shaders to remap the first set of surfaces using the particular remapping LUT to create a second set of surfaces (block 625). Then, for each frame, the second set of surfaces are driven to a display (block 630). After block 630, method 600 ends.

Figure 7:
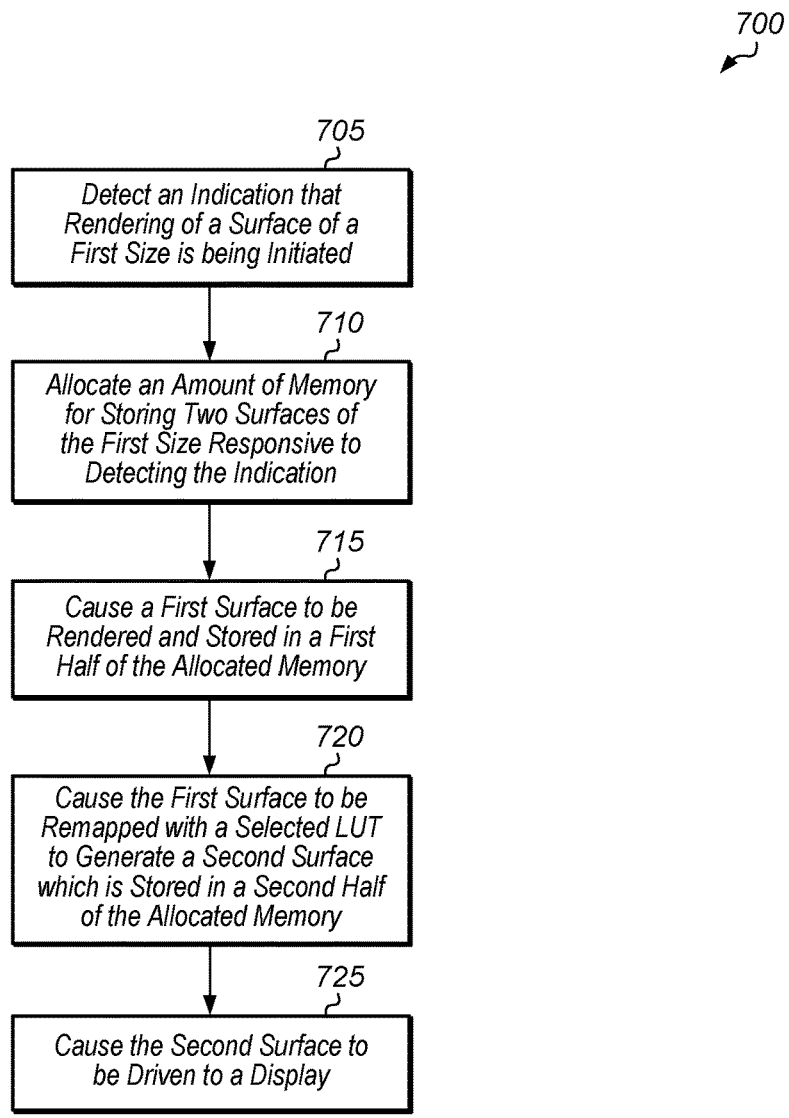
FIG. 7 is a generalized flow diagram illustrating one implementation of a method for allocating double the memory for a surface being rendered.

Referring now to FIG. 7, one implementation of a method 700 for allocating double the memory for a surface being rendered is shown. A processor detects an indication that rendering of a surface of a first size is being initiated (block 705). Next, the processor allocates an amount of memory for storing two surfaces of the first size responsive to detecting the indication (block 710). Then, the processor causes a first surface to be rendered and stored in a first half of the allocated memory (block 715). Next, the processor causes the first surface to be remapped with a selected lookup table (LUT) to generate a second surface which is stored in a second half of the allocated memory (block 720). Then, the processor causes the second surface to be driven to a display (block 725). After block 725, method 700 ends.

Figure 8:
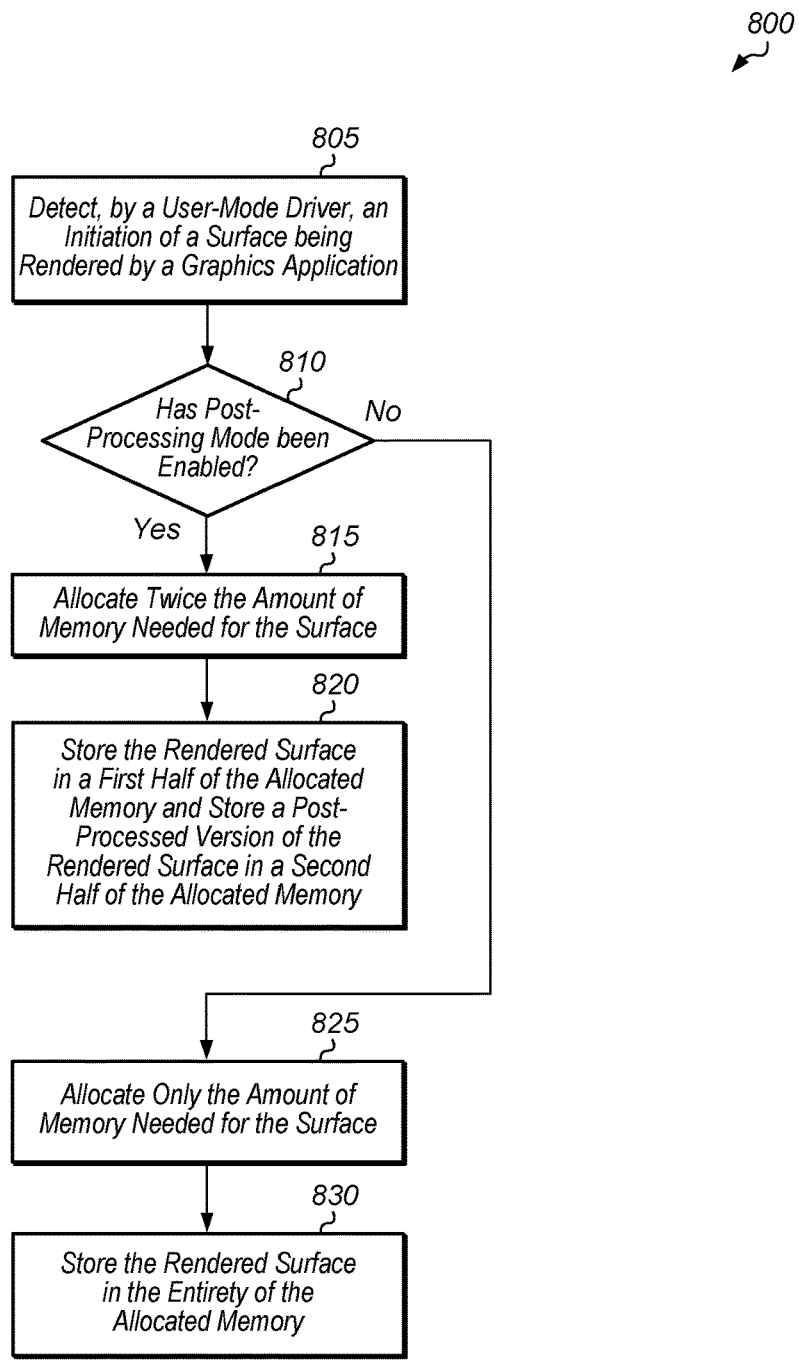
FIG. 8 is a generalized flow diagram illustrating one implementation of a method for employing a post-processing mode for a rendered surface.

Turning now to FIG. 8, one implementation of a method 800 for employing a post-processing mode for a rendered surface is shown. A user-mode driver detects the initiation of a surface being rendered by a graphics application (block 805). In response to detecting the initiation of the surface being rendered, the user-mode driver determines if a post-processing mode has been enabled for the system (conditional block 810). If the post-processing mode has been enabled (conditional block 810, "yes" leg), then the user-mode driver allocates more memory than is needed for the surface (block 815). For example, in one embodiment, twice the amount of memory needed for the surface is allocated. After block 815, the rendered surface is stored in a first portion (e.g., first half) of the allocated memory and a post-processed version of the rendered surface is stored in a different second portion (e.g., second half) of the allocated memory (block 820). After block 820, method 800 ends. Otherwise, if the post-processing mode has not been enabled (conditional block 810, "no" leg), then the user-mode driver allocates only the amount of memory needed for the surface (block 825). After block 825, the rendered surface is stored in the entirety of the allocated memory (block 830). After block 830, method 800 ends.

Figure 9:
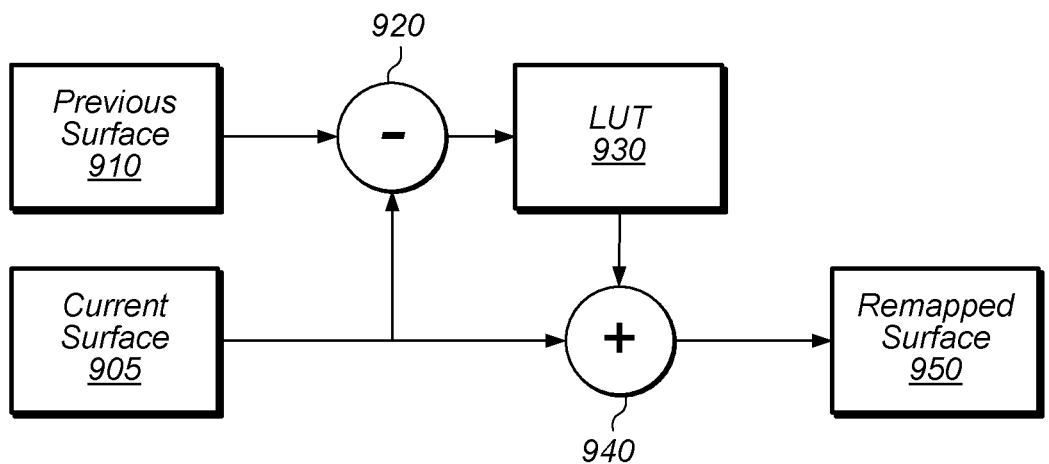
FIG. 9 is a block diagram of one implementation of using a LUT to generate a remapped surface for display.

Referring now to FIG. 9, a block diagram of one implementation of using a LUT to generate a remapped surface for display is shown. In one implementation, for each pixel of current surface 905, the difference between this pixel value and the pixel value for the corresponding pixel of previous surface 910 is calculated by comparator 920. Then, for each pixel, the difference calculated by comparator 920 is provided to LUT 930. A lookup to LUT 930 is performed with the difference in pixel values, and a remapping value is retrieved from a matching entry of LUT 930. This remapping value can also be referred to as a boost value. Then, adder 940 adds this remapping value to the original pixel value of current surface 905 to generate the corresponding pixel value of remapped surface 950. These operations are performed for each pixel of each channel of current surface 905 to generate a corresponding pixel of each channel of remapped surface 950. It is noted that each channel can have a separate LUT 930. Once remapped surface 950 is generated in its entirety, remapped surface 950 is driven to a display. In other implementations, other operations can be performed using LUT 930 to modify the pixel values of current surface 905 so as to generate the pixel values of remapped surface 950.

In one implementation, a kernel-mode driver (e.g., kernel-mode driver 325 of FIG. 3) launches a plurality of shaders on a graphics processor to perform the operations shown in FIG. 9 for converting current surface 905 into remapped surface 950 using LUT 930. In other implementations, other types of post-processing operations can be performed on current surface 905 to generate remapped surface 950. In one implementation, LUT 930 is selected from a plurality of LUTs based on the operating conditions of a target display. In one implementation, the target display is integrated within the overall computing system. For example, a laptop includes an integrated display and LUT 930 is selected based on this integrated display. In another implementation, the target display is external to the host computing system. For example, a desktop computer includes an external display, and different types of external displays can be connected to the desktop computer. In a further implementation, a server renders surfaces which are sent to a client to be displayed. In this implementation, the client can use any of various types of displays.

For implementations with external displays, a driver (e.g., user-mode driver, kernel-mode driver) performs a discovery phase to determine the target display on which rendered surfaces will be shown. In one implementation, the driver sends a request to a user-mode application for an indication of the type of target display being used and/or for the current operating conditions of the target display. The driver waits to receive a response, with the response including an identification of the type of target display and/or current operating conditions. Then, the driver selects a LUT or a set of LUTs which match the specific type of target display and/or current operating conditions. In some cases, there may not be a LUT which precisely matches the specific type of target display. In these cases, the driver determines which LUT is closest to the specific type of target display, and then this LUT is selected for generating remapped surface 950 from current surface 905. In one implementation, the driver combines the two LUTs that most closely match the target display to create a LUT to use for the display. In another implementation, the driver creates a new LUT based on characteristics of the specific attached display.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   first processor circuitry coupled to a memory subsystem, wherein responsive to detection of an indication that rendering of a first surface is being initiated, the first processor circuitry is configured to:
   allocate given memory comprising at least twice an amount of memory in the memory subsystem needed for storing the first surface;
   cause the first surface to be rendered and stored in a first portion of the given memory;
   cause, by a kernel-mode driver, the first surface to be remapped with a selected lookup table (LUT) to generate a second surface which is stored in a second portion of the given memory; and
   cause the second surface to be driven to a display.

2. The system as recited in claim 1, wherein the first processor circuitry is further configured to execute a user application which identifies the selected LUT for remapping the first surface.

3. The system as recited in claim 1, wherein the first processor circuitry is configured to execute a kernel-mode driver, wherein executing the kernel-mode driver causes one or more shaders to be launched on a second processor for remapping the first surface with the selected LUT to generate the second surface.

4. The system as recited in claim 1, wherein the first processor circuitry is further configured to execute the kernel-mode driver.

5. The system as recited in claim 4, wherein the first processor circuitry is further configured to execute the kernel-mode driver to delay a flip of frame buffers responsive to receiving a flip request with respect to the first surface.

6. The system as recited in claim 5, wherein the first processor circuitry is further configured to cause the frame buffers to flip responsive to generation of the second surface completing.

7. The system as recited in claim 1, wherein the first surface is a composite frame comprising a plurality of pixels.

8. A method comprising:
   detecting, by circuitry of a first processor, an indication that rendering of a first surface is being initiated;
   responsive to detecting the indication that rendering of the first surface is being initiated:
   allocating given memory comprising at least twice an amount of memory in a memory subsystem needed for storing the first surface;
   causing the first surface to be rendered and stored in a first half of the given memory;
   causing, by a kernel-mode driver, the first surface to be remapped with a selected lookup table (LUT) to generate a second surface which is stored in a second half of the given memory; and
   causing the second surface to be driven to a display.

9. The method as recited in claim 8, further comprising executing a user application which identifies the selected LUT for remapping the first surface.

10. The method as recited in claim 8, further comprising executing a kernel-mode driver that causes one or more shaders to be launched on a second processor for remapping the first surface with the selected LUT to generate the second surface.

11. The method as recited in claim 8, further comprising executing he kernel-mode driver.

12. The method as recited in claim 11, further comprising executing the kernel-mode driver to delay a flip of frame buffers responsive to receiving a flip request with respect to the first surface.

13. The method as recited in claim 12, further comprising causing the frame buffers to flip responsive to generation of the second surface completing.

14. The method as recited in claim 8, wherein the first surface is a composite frame comprising a plurality of pixels.

15. An apparatus comprising:
   a first processor comprising circuitry configured to:
   detect an indication that rendering of a first surface of a first size is being initiated;
   allocate given memory comprising an amount of memory in a memory subsystem for storing two surfaces of the first size, responsive to detecting the indication; and
   a second processor comprising circuitry configured to:
   render and store the first surface in a first half of the given memory;

remap the first surface with a selected lookup table (LUT) to generate a second surface;

store the second surface in a second half of the given memory; and drive the second surface to a display.

16. The apparatus as recited in claim 15, wherein the first processor is further configured to:

execute a user-mode driver to allocate memory for two surfaces responsive to receiving, from a first user application, a request to render a single surface to be displayed;

execute the first user application to cause the first surface to be rendered; and execute kernel-mode driver.

17. The apparatus as recited in claim 16, wherein the first processor is further configured to execute a second user application which provides, to the kernel-mode driver, an index which identifies the selected LUT for remapping the first surface.

18. The apparatus as recited in claim 16, wherein the first processor is further configured to execute the kernel-mode driver to delay a flip of frame buffers responsive to receiving a flip request with respect to the first surface.

19. The apparatus as recited in claim 18, wherein the first processor is further configured to cause the frame buffers to flip responsive to generation of the second surface completing.

20. The apparatus as recited in claim 15, wherein the first surface is a composite frame comprising a plurality of pixels.

* * * * *